United States Patent
Kluwe et al.

(10) Patent No.: US 10,371,900 B2
(45) Date of Patent: Aug. 6, 2019

(54) OPTICAL ADAPTOR FOR MOUNTING TO A RECEPTACLE TO OPTICALLY COUPLE CONNECTORIZED OPTICAL CABLES

(71) Applicant: CCS Technology, Inc., Wilmington, DE (US)

(72) Inventors: Wolf Peter Kluwe, Hagen (DE); Jürgen Matthies, Wetter (DE); Gordon Mueller-Schlomka, Berlin (DE); Martin Schulte, Wildau (DE); Michael Wimmer, Berlin (DE)

(73) Assignee: Corning Optical Communications, LLC, Hickory, NC (US)

( * ) Notice: Subject to any disclaimer, the term of this patent is extended or adjusted under 35 U.S.C. 154(b) by 18 days.

(21) Appl. No.: 15/435,534

(22) Filed: Feb. 17, 2017

(65) Prior Publication Data
US 2017/0160477 A1 Jun. 8, 2017

Related U.S. Application Data

(63) Continuation of application No. PCT/US2015/047872, filed on Sep. 1, 2015.

(30) Foreign Application Priority Data

Sep. 4, 2014 (EP) .................................... 14183573

(51) Int. Cl.
G02B 6/38 (2006.01)

(52) U.S. Cl.
CPC ........... *G02B 6/3825* (2013.01); *G02B 6/387* (2013.01); *G02B 6/3874* (2013.01);
(Continued)

(58) Field of Classification Search
CPC ...... G02B 6/26; G02B 6/3825; G02B 6/3891; G02B 6/3874; G02B 6/387; G02B 6/3893; G02B 6/3894
(Continued)

(56) References Cited

U.S. PATENT DOCUMENTS 5,274,729 A  12/1993 King et al.
5,297,227 A   3/1994 Brown et al.
(Continued)

FOREIGN PATENT DOCUMENTS

CN   102868447 A   1/2013
EP    0967497 A1   12/1999
(Continued)

OTHER PUBLICATIONS

Patent Cooperation Treaty, International Search Report and Written Opinion for PCT/US15/47869, dated Jan. 5, 2016, 11 pages.
(Continued)

*Primary Examiner* — Michael P Mooney
(74) *Attorney, Agent, or Firm* — Michael E. Carroll, Jr.

(57) ABSTRACT

An optical adaptor for mounting to a receptacle to optically couple connectorized opticable cables comprises an assembly of an optical interface to provide an optical path between a first and a second one of the connectorized optical cables to optically couple the first and the second connectorized optical cable. The assembly of the optical interface comprises a mounting element to mount the optical adaptor to the receptacle. The mounting element is configured to receive the assembly of the optical interface and to mechanically couple the first connectorized optical cable to the mounting element so that the first connectorized optical cable is optically coupled to the first side of the assembly of the optical interface.

20 Claims, 9 Drawing Sheets

(52) U.S. Cl.
CPC ......... *G02B 6/3891* (2013.01); *G02B 6/3893* (2013.01); *G02B 6/3894* (2013.01)

(58) Field of Classification Search
USPC .................................................... 385/53–87
See application file for complete search history.

(56) References Cited

U.S. PATENT DOCUMENTS

| | | | |
|---|---|---|---|
| 5,537,501 | A | 7/1996 | Iwano et al. |
| 6,102,581 | A | 8/2000 | Deveau et al. |
| 6,149,315 | A | 11/2000 | Stephenson |
| 6,341,191 | B1 | 1/2002 | Takahashi |
| 6,579,014 | B2 | 6/2003 | Melton et al. |
| 6,648,520 | B2 | 11/2003 | McDonald et al. |
| 6,802,653 | B2 | 10/2004 | Deane |
| 7,614,797 | B2 | 11/2009 | Lu et al. |
| 7,686,519 | B2 | 3/2010 | Lu |
| 8,480,310 | B2 | 7/2013 | Kewitsch |
| 8,864,389 | B2 * | 10/2014 | Lin ................... G02B 6/3897 385/58 |
| 2003/0095779 | A1 | 5/2003 | Chang |
| 2006/0088248 | A1 | 4/2006 | Tran et al. |
| 2007/0196053 | A1 * | 8/2007 | Kewitsch ............. G02B 6/3825 385/74 |
| 2009/0003772 | A1 | 1/2009 | Lu et al. |
| 2009/0282214 | A1 | 11/2009 | Kuesel et al. |
| 2012/0263419 | A1 | 10/2012 | Briggs et al. |
| 2014/0044394 | A1 | 2/2014 | Lin |
| 2014/0133804 | A1 | 5/2014 | Lu et al. |
| 2016/0139343 | A1 | 5/2016 | Dean, Jr. et al. |

FOREIGN PATENT DOCUMENTS

| | | |
|---|---|---|
| JP | 2006258861 A | 9/2006 |
| JP | 2009103837 A | 5/2009 |
| WO | 2015197588 A1 | 12/2015 |

OTHER PUBLICATIONS

Patent Cooperation Treaty, International Search Report and Written Opinion for PCT/US2015/047868, dated Jan. 7, 2016, 11 pages.
Patent Cooperation Treaty, International Search Report and Written Opinion for PCT/US2015/047872, dated Dec. 21, 2015, 10 pages.
Patent Cooperation Treaty, International Search Report and Written Opinion for PCT/US2015/059430, dated Jun. 1, 2016, 15 pages.
Commscope, "Hardened Drop Cable and Connector Solultions," http://www.commscope.com/Docs/Hardened-Drop-Cable-and-Connector-Solutions-311638BE.pdf, 4 pages.

* cited by examiner

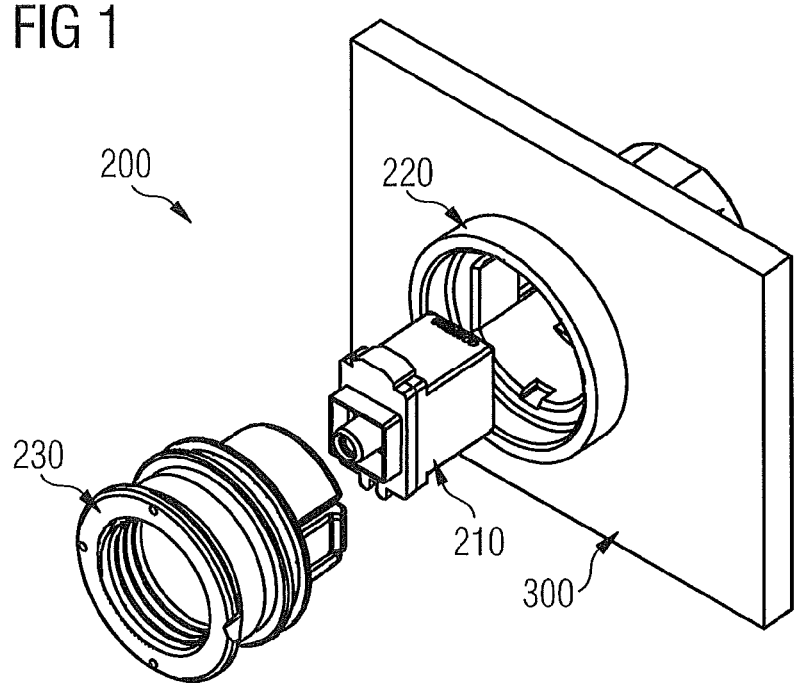
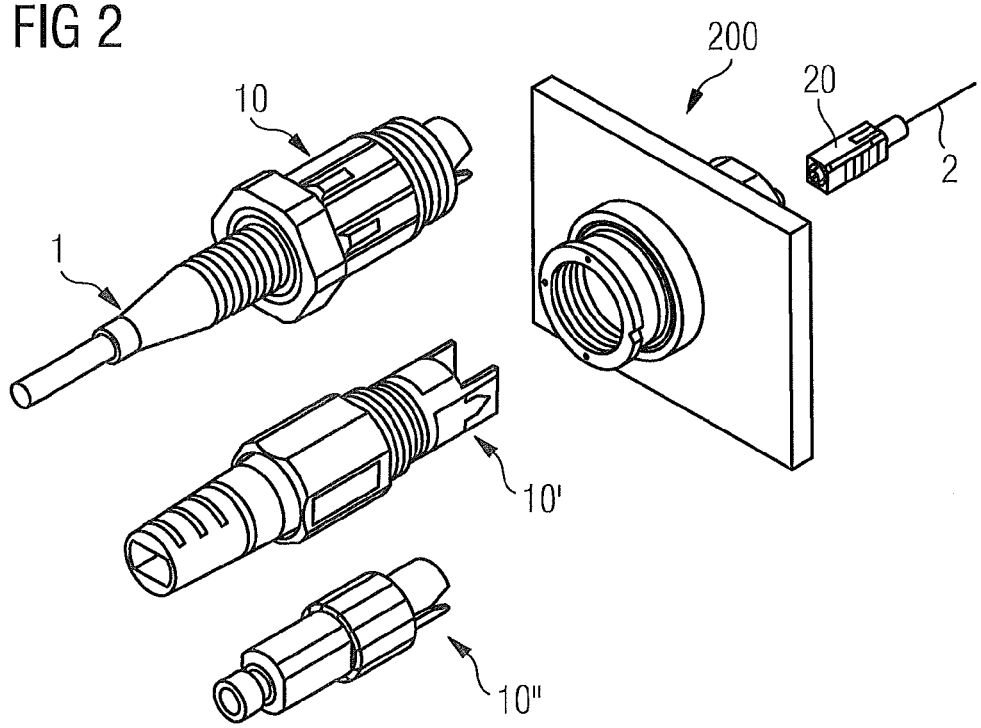

OPTICAL ADAPTOR FOR MOUNTING TO A RECEPTACLE TO OPTICALLY COUPLE CONNECTORIZED OPTICAL CABLES

CROSS-REFERENCE TO RELATED APPLICATIONS

This application is a continuation of International Application No. PCT/US2015/47872, filed on Sep. 1, 2015, which claims the benefit of priority under 35 U.S.C. § 119 of European Patent Application Serial No. 14183573.6, filed on Sep. 4, 2014, the content of which is relied upon and incorporated herein by reference in their entirety.

FIELD

The present application relates to an optical adaptor for mounting to a receptacle to optically couple connectorized cables. Connectorized cables include, for example, cables with connectors installed on them in the field, and cables with connectors installed on them in the factory being preconnectorized optical cables. Such connectorized optical cables respectively comprise at least one optical fiber which is to optically connect to each other. The application further relates to an optical assembly to optically couple connectorized cables, for example, preconnectorized optical cables to each other.

BACKGROUND

Optical cables, such as fiber optic drop cables, are capable of transmitting an extremely large amount of bandwidth compared with copper cables. The development in communication networks tends to bring optical cables closer to subscribers to have access to the increased bandwidth. However, there are certain obstacles that make it challenging and/or expensive to route optical cables deeper into the communication network, i.e. closer to a subscriber.

For instance, making a suitable optical connection between optical waveguides is much more difficult than making an electrical connection between copper wires. This is because optical connections require special tools and equipment, highly trained craftsmen, along with precision components. Additionally, as the communication network pushes towards subscribers, the communication network requires more connections, which compounds the difficulties of providing optical waveguides to the premises of the subscriber.

In order to couple generic cables having a simple structure, for example copper cables, the ends of the cables may be terminated by suitable pairs of connectors such as complementarily shaped connectors. In order to ensure the coupling of light between fiber optic cables with low attenuation, the ends of the optical fibers to be coupled have to be precisely aligned.

A precise alignment of optical fibers to be connected to each other may be ensured by using a receptacle/an optical port being adjusted to receive the optical connectors respectively terminating each of the optical cables in order to guarantee a precise coupling of the optical fibers included in the optical cables. In order to couple a first and a second cable with connectors on them, for example, preconnectorized optical cable, a first optical connector terminating the first optical cable may be inserted in the receptacle at a first side of the receptacle, and a second optical connector terminating the second optical cable may be inserted in the receptacle at a second side of the receptacle.

The receptacle provides at least a mounting function for the optical connectors terminating the optical cables. The receptacle may also provide a mechanical coupling function for the optical connectors and an optical coupling function for the optical fibers of the optical cables. In order to provide the mechanical and optical coupling function the receptacle may comprise a coupling element. The coupling element is usually configured to receive the first optical connector at a first side of the coupling element and to receive the second connector at a second side of the coupling element.

The receptacle is usually adapted to the type of optical connectors to be coupled. A receptacle may, for example, be designed by a manufacturer to couple the first optical connector of a first type to the second optical connector of the same type or a second different type. The first optical connector may be a connector made by the same manufacturer which also produces the receptacle. The second optical connector may be a connector of an industrial standard. Several industrial standard connector types are available such as SC connector, ST connector and LC connector.

The precise coupling of connectorized cables such as preconnectorized optical cables will be challenging, if one of the optical connectors has to be replaced by an optical connector of another type and a subscriber do not wish to substitute the already pre-installed receptacle. Assuming that the exchanged first optical connector is an optical connector being produced by another manufacturer than the manufacturer of the primarily installed receptacle, the new first optical connector will not be compatible with the existing receptacle. If the exchanged optical connector has a different size and/or shape than the previously installed first optical connector which was used thitherto with the receptacle, the newly used first optical connector may often not even be inserted in the receptacle let alone optically coupled to the second optical connector. In this case, it is necessary to use an optical adaptor as an intermediate part between the new first optical connector, the receptacle and the second optical connector.

There is a need to provide an optical adaptor being mountable to a receptacle to optically couple connectorized cables such as preconnectorized optical cables which allows a precise alignment of the optical fibers of the connectorized optical cables. There is also a desire to provide an optical assembly to optically couple connectorized cables such as connectorized optical cables to ensure a precise alignment of the optical fibers of the connectorized optical cables.

SUMMARY

An embodiment of an optical adaptor for mounting to a receptacle to optically couple connectorized optical cables is specified in present claim 1.

According to an embodiment of the optical adaptor for mounting to a receptacle to optically couple connectorized optical cables, the optical adaptor comprises an assembly of an optical interface to provide an optical path between a first and a second one of the connectorized optical cables to optically couple the first and the second connectorized optical cable. The assembly of the optical interface has a first side to optically couple the first connectorized optical cable to the optical path and a second side to optically couple the second connectorized optical cable to the optical path. The optical adaptor comprises a mounting element to mount the optical adaptor to the receptacle. The mounting element is configured to receive the assembly of the optical interface and to mechanically couple the first connectorized optical cable to the mounting element so that the first connectorized optical cable is optically coupled to the first side of the assembly of the optical interface.

An embodiment of an optical assembly to optically couple connectorized optical cables is specified in present claim 12.

According to an embodiment of the optical assembly, the optical assembly comprises the optical adaptor for mounting to a receptacle to optically couple the connectorized optical cables as specified above. The receptacle comprises a coupling element being configured to mechanically couple an optical connector to terminate the second connectorized optical cable to the receptacle and to optically couple the second connectorized optical cable to the assembly of the optical interface of the optical adaptor.

BRIEF DESCRIPTION OF THE DRAWINGS

FIG. 1 is a perspective view of a receptacle to couple connectorized cables such as preconnectorized optical cables;

FIG. 2 shows first optical connectors of a different type to be connected to a second optical connector by a receptacle;

DETAILED DESCRIPTION

Figure 3A:
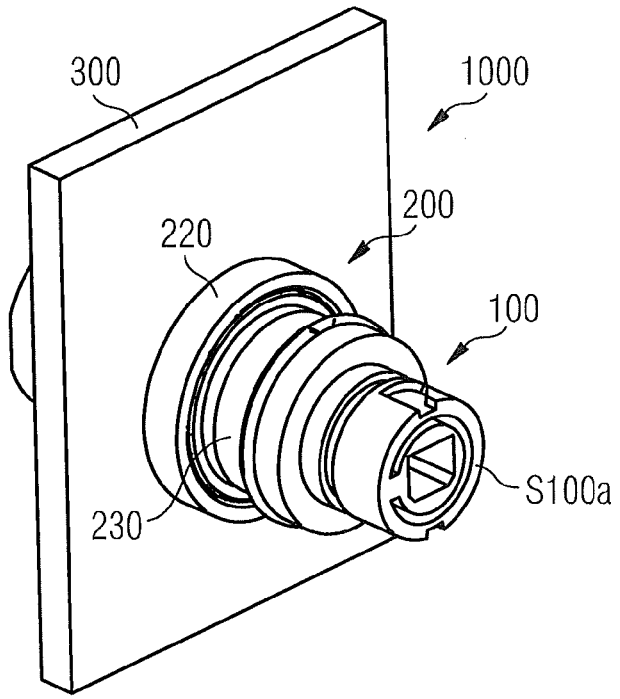
FIG. 3A shows an optical assembly to couple connectorized optical cables comprising an optical adaptor and a receptacle in a mated condition.

The present application will now be described in more detail hereinafter with reference to the accompanying drawings showing the disclosed embodiments. The concepts may, however, be embodied in many different forms and should not be construed as limited to the embodiments set forth herein; rather, these embodiments are provided so that the disclosure will fully convey the scope of the concepts to those skilled in the art. The drawings are not necessarily drawn to scale but are configured to clearly illustrate the concepts.

FIG. 1 shows an embodiment of a receptacle 200 comprising a coupling element 210 to which an optical connector terminating an optical cable, for example a fiber optic drop cable, may be connected. The receptacle 200 is fixed at a housing 300, for example at the housing of a distribution closure. The receptacle 200 comprises a fixture 220 arranged in a bore hole of a housing 300 such as a housing of a distribution closure. The receptacle 200 comprises a fixation adaptor 230 which may be mounted to the fixture 220 by inserting the fixation adaptor into the fixture 220. The fixation adaptor 230 may comprise snap hooks to engage the fixation adaptor 230 to the fixture 220 and to securely hold the fixation adaptor 230 inside the fixture 220. The coupling element 210 may be inserted and securely held in the fixation adaptor 230. The coupling element 210 is configured to connect a first optical connector terminating a first optical cable to a second optical connector terminating a second optical cable. The coupling element 210 is further configured to optically couple an optical fiber of the first optical cable to an optical fiber of the second optical cable.

FIG. 2 shows a connectorized cable such as a preconnectorized optical cable 1, for example a fiber optic drop cable, which is terminated at its end by an optical connector 10 of a first type. FIG. 2 shows other optical connectors 10' and 10" being of a different second and third type. Another optical cable 2 is terminated at its end by optical connector 20 being of a fourth type. The optical connector 20 may be configured as a connector of a SC industrial standard type. The receptacle 200 comprises the coupling element 210, the fixture 220 and the fixation adaptor 230 as illustrated in FIG. 1. Several industrial standard connector types are available such as SC connector, ST connector and LC connector. These connectors are connected to the optical fiber to align it relative to a ferrule provided within the assembly. The front face of the connector is used to align the optical fiber. In the detailed embodiment, the assembly is described using an SC connector. Other connectors such as ST or LC connector may be used instead of an SC connector what requires adaption to the particular front face of the connector and the changes required are apparent to a skilled artisan. Cable 1 may be a cable with a connector installed on it. The connector may be installed in the factory being a preconnectorized optical cable. This disclosure and the described embodiments contemplate also connectorized cables with connectors installed on them in the field.

The receptacle 200 is configured to optically couple the preconnectorized optical cable 1 being terminated with the optical connector 10 to the preconnectorized optical cable 2 being terminated with the optical connector 20. In particular, the optical connector 10 may be connected to the coupling element 210 at the front side of the coupling, and the optical connector 20 may be fixed to the coupling element 210 at a rear side of the coupling element such that the optical fibers of the optical cable 1 and 2 are aligned to each other so that an optical attenuation of light coupled between the preconnectorized optical cables 1 and 2 is reduced.

Due to the required precise alignment of the optical fibers of the optical cables to be coupled to each other the receptacle 200 and particularly the coupling element 210, the fixture 220 and the fixation adaptor 230 of the receptacle are usually adapted to couple specific types of optical connectors to each other. The receptacle 200 may be designed to couple the optical connector 10 of the first type to the optical connector 20 of the fourth type. However, the receptacle 200 is not configured to couple the optical connector 20 with one of the other optical connectors 10', 10" being of the second and third type.

In order to avoid a complete exchange of the receptacle 200 for coupling one of the optical connectors 10' and 10" to the optical connector 20, an optical adaptor has to be arranged between the receptacle 200 and the respective optical connector 10', 10" as an intermediate component to directly couple one of the optical connectors 10', 10" to the optical connector 20 or to couple one of the optical connectors 10', 10" to a first side of the optical adaptor and to couple the existing coupling element 210 of the receptacle 200 to a second side of the optical adaptor.

FIG. 3A shows an optical assembly 1000 comprising an optical adaptor 100 and a receptacle 200 to mount the optical adaptor. The receptacle 200 comprises a fixture 220 and a fixation adaptor 230, wherein the fixation adaptor 230 is fixed to the fixture 220. The optical adaptor 100 is mounted to the receptacle 200 and allows to couple an optical connector to a side S100a of the optical adaptor 100. Another optical connector may be coupled to the opposite side of the receptacle shown in FIG. 3A behind the housing 300. Both of the optical connectors may be used as a termination of a respective optical cable comprising an optical fiber. The optical assembly 1000 allows to optically couple the preconnectorized optical cables.

Figure 3B:
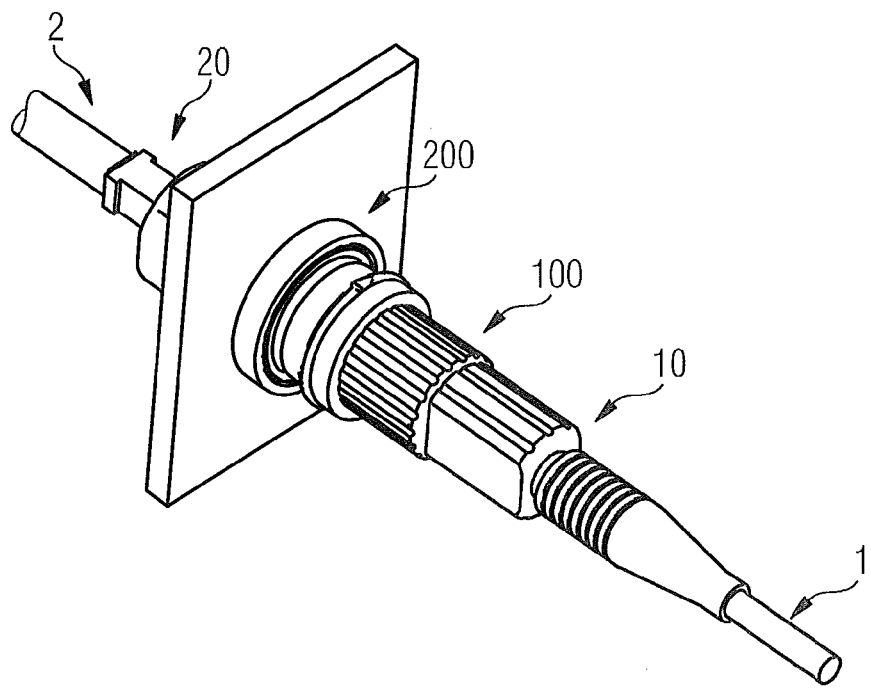
FIG. 3B shows an optical assembly in a mated condition coupled with a first and a second connectorized optical cable.

FIG. 3B shows the optical assembly 1000 of FIG. 3A, wherein an optical connector 10 is coupled to the side S100a of the optical adaptor 100 and another optical connector 20 is coupled to the rear side of the receptacle 200. The optical connector 10 terminates an optical cable 1. The optical adaptor 100 is configured to mechanically couple the optical connector 10. The receptacle 200 is configured to mechanically couple the optical connector 20. The optical assembly 1000 provides, inside the optical adaptor 100 and the receptacle 200, an optical path which is configured to optically couple the preconnectorized optical cable 1 to the preconnectorized optical cable 2.

Figure 4A:
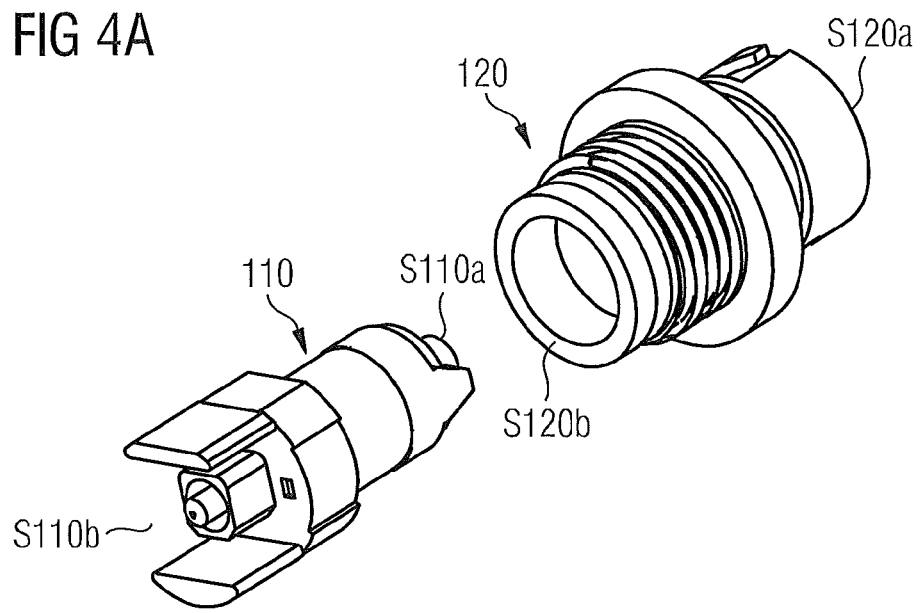
FIG. 4A is a perspective view of an optical adaptor comprising an assembly of an optical interface and a mounting element in an unmated condition.

FIG. 4A illustrates different components of the optical adaptor 100 in an unmated condition. The optical connector 100 comprises an assembly of an optical interface 110 to provide the optical path between the preconnectorized optical cables 1 and 2 shown in FIG. 3B. The assembly of the optical interface 110 has a first side S110a to optically couple the preconnectorized optical cable 1 to the optical path and a side S110b to optically couple the preconnectorized optical cable 2 to the optical path. The optical path is disposed in the interior of the assembly of the optical interface 110 and is configured to optically couple the preconnectorized optical cables 1 and 2 to each other so that light may be transferred between the preconnectorized optical cables 1 and 2 with low attenuation.

Figure 8A:
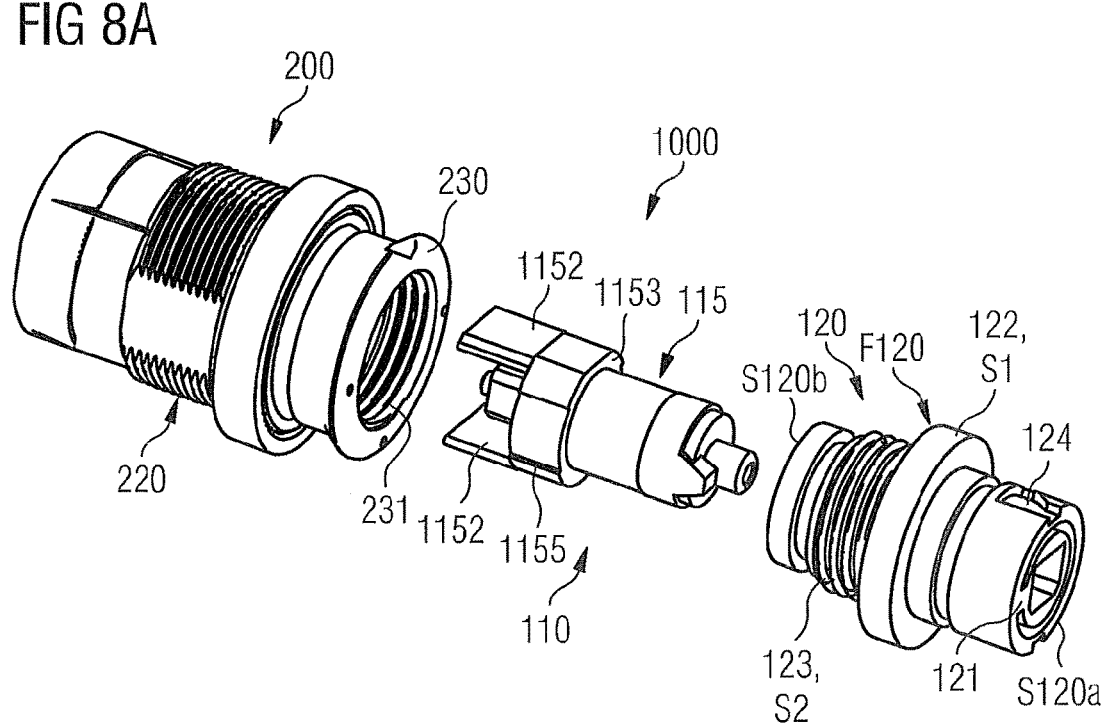
FIG. 8A shows an assembly of an optical interface, a mounting element of an optical adaptor and a receptacle in an unmated condition.

The optical adaptor 100 further comprises a mounting element 120 to mount the optical adaptor to the receptacle 200. The mounting element 120 is configured to receive the assembly of the optical interface 110. The mounting element 120 is further configured to mechanically couple the preconnectorized optical cable 1 to the mounting element 120 so that the preconnectorized optical cable 1 is optically coupled to the side S110a of the assembly of the optical interface 110. The mounting element 120 may be configured as a hollow body having a side S120a to which the optical connector 10 may be mechanically coupled. The assembly of the optical interface 110 may be inserted into the hollow body of the mounting element 120 at the side S120b. The optical interface 110 and the mounting element 120 are separable parts to be inserted one into the other. The insertion of the optical interface 110 into the mounting element 120 is straight while the mounting element 120 has a thread 123 shown between end side S120b and shoulder 122 (FIG. 8A). Accordingly, the optical interface 110 is inserted straight while the mounting element 120 requires a rotational (screw) fixation.

Figure 4B:
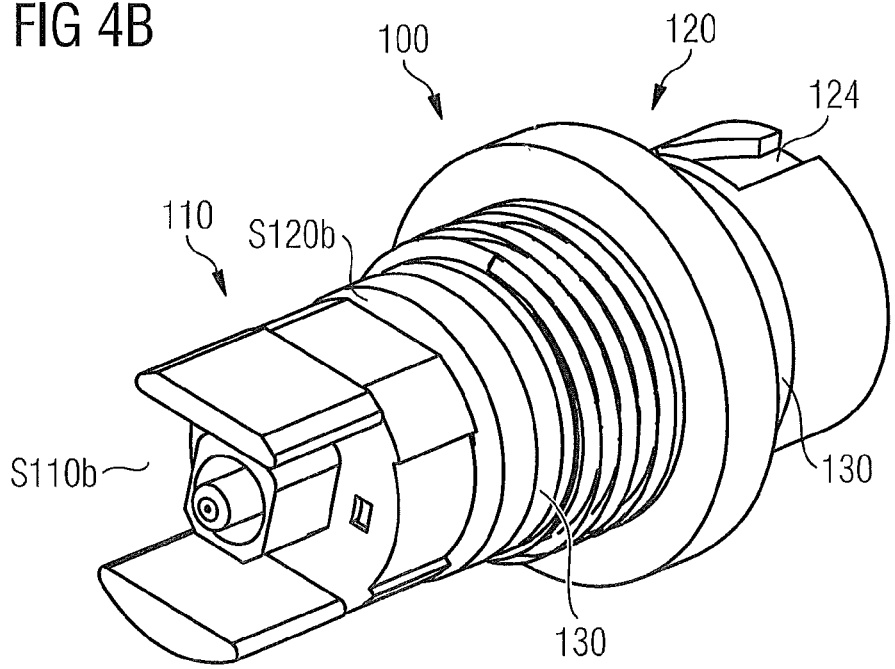
FIG. 4B shows a perspective view of the optical adaptor in an assembled configuration.

FIG. 4B shows the optical adaptor 100 comprising the assembly of the optical interface 110 and the mounting element 120 in a mated condition. The assembly of the optical interface 110 is inserted in the hollow body of the mounting element 120 at the side S120b of the mounting element. A portion of the assembly of the optical interface 110 including the side S110b protrudes from the hollow body of the mounting element 120 at the side S120b.

Figure 5:
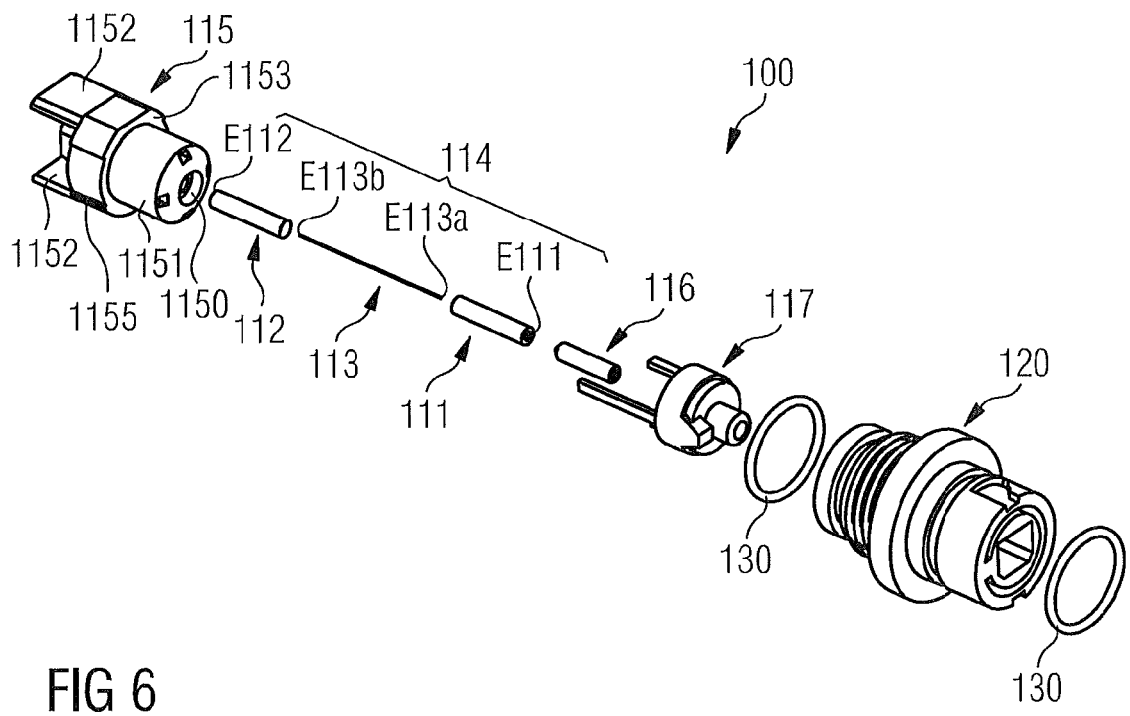
FIG. 5 shows an exploded view of an optical adaptor.

FIG. 5 shows a detailed exploded view of the optical adaptor 100. The optical adaptor comprises the assembly of the optical interface 110, the mounting element 120 and sealing elements 130 which may be arranged on an outer surface of the body of the mounting element 120 as shown in FIG. 4B.

The assembly of the optical interface 110 comprises at least one ferrule 111, 112 encapsulating an optical fiber 113. The at least one ferrule 111, 112 and the optical fiber 113 provides the optical path 114. The assembly of the optical interface 110 comprises a connector interface 115 having a centrally arranged bore hole 1150 in which the optical path 114 is inserted so that the at least one ferrule 111, 112 and the optical fiber 113 is disposed in the bore hole 1150 of the connector interface 115. The assembly of the optical interface 110 further comprises a sleeve 116 and a sleeve holder 117 to hold the sleeve 116. The sleeve 116 is configured to receive an end E111 of the at least one ferrule. The sleeve holder 117 has a centrally arranged bore hole 1170 in which the sleeve 116 may be inserted.

According to a possible embodiment of the optical adaptor 100 the assembly of the optical interface 110 comprises two ferrules, i.e. a ferrule 111 and a ferrule 112 as well as an optical fiber 113, as shown in FIG. 5. The optical fiber 113 may have a section 113a and a section 113b. The section 113a of the optical fiber 113 is encapsulated by the ferrule 111, and the section 113b of the optical fiber 113 is encapsulated by the ferrule 112 in the assembled state of the optical adaptor. That means that the optical fiber 113 is arranged inside the ferrules 111 and 112. In particular, the end E113a of the optical fiber 113 terminates at an end E111 of the ferrule 111, and the end E113b of the optical fiber 113 terminates at an end E112 of the ferrule 112. The end E111 of the ferrule 111 and the end E113a of the optical fiber 113 are configured to optically couple light between the optical fiber 113 and the preconnectorized optical cable 1. The end E112 of the ferrule 112 and the end E113b of the optical fiber 113 are configured to optically couple light between the optical fiber 113 and the preconnectorized optical cable 2.

Figure 6:
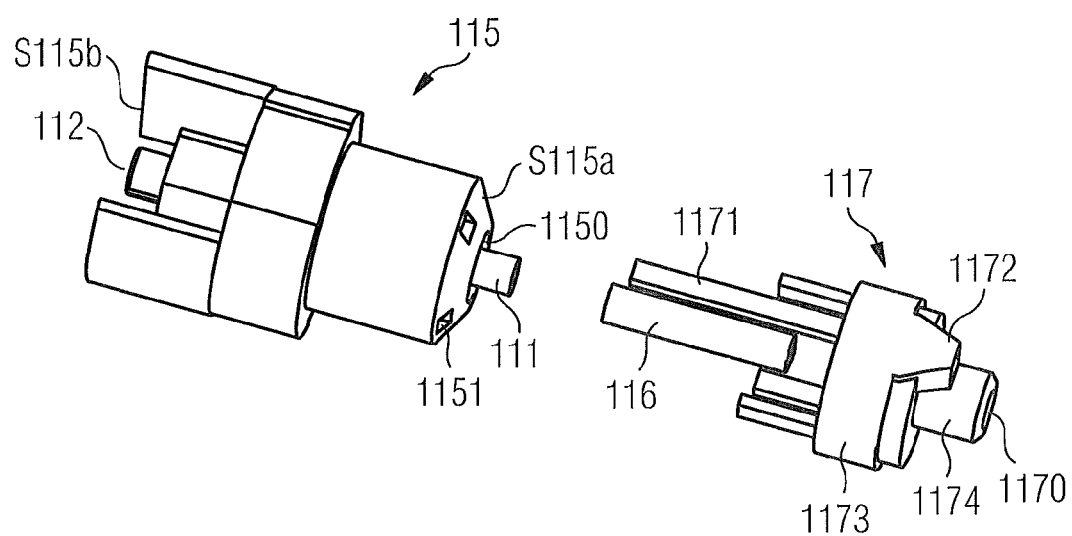
FIG. 6 shows an assembly of an optical interface of an optical adaptor in an unmated condition.

FIG. 6 shows the assembly of the optical interface 110 comprising the connector interface 115 and the sleeve holder 117 in an unmated condition. The optical path 114 comprising the ferrules 111, 112 and the optical fiber 113 guided therein is disposed in the bore hole 1150 of the optical interface 115 so that the ferrule 111 protrudes at a side S115a from the connector interface 115 and the ferrule 112 protrudes at a side S115b of the connector interface 115. The sleeve 116 is shown before inserting in the bore hole 1170 of the sleeve holder 117. The bore hole 1170 inside of the sleeve holder 117 is extended from a base part 1173 of the sleeve holder by a tube-shaped part 1174 which protrudes out of a base part of the sleeve holder 117. After the sleeve 116 is inserted in the bore hole 1170, the optical interface 115 comprising the optical path 114 and the sleeve holder 117 including the sleeve 116 may be mounted as shown in FIG. 4A.

In order to mechanically couple the optical interface 115 and the sleeve holder 117 in the right direction, the connector interface 115 comprises an alignment element 1151 which may be configured as at least one hole inside the body of the connector interface 115. According to the embodiment of the connector interface 115 shown in FIG. 6, the connector interface 115 may comprise several holes having a different shape or depth. The sleeve holder 117 may comprise an alignment element 1171. The alignment element 1151 of the connector interface 115 and the alignment element 1171 of the sleeve holder 117 may be formed in a complementary manner to direct the coupling of the sleeve holder 117 to the connector interface 115. The alignment element 1171 may comprise several stays 1171 protruding from the base part 1173 of the sleeve holder 117, wherein the stays 1171 may have different lengths or widths. The stays 1171 and the holes 1151 are configured such that the sleeve holder 117 fits only in one direction to the connector interface 115.

Figure 7A:
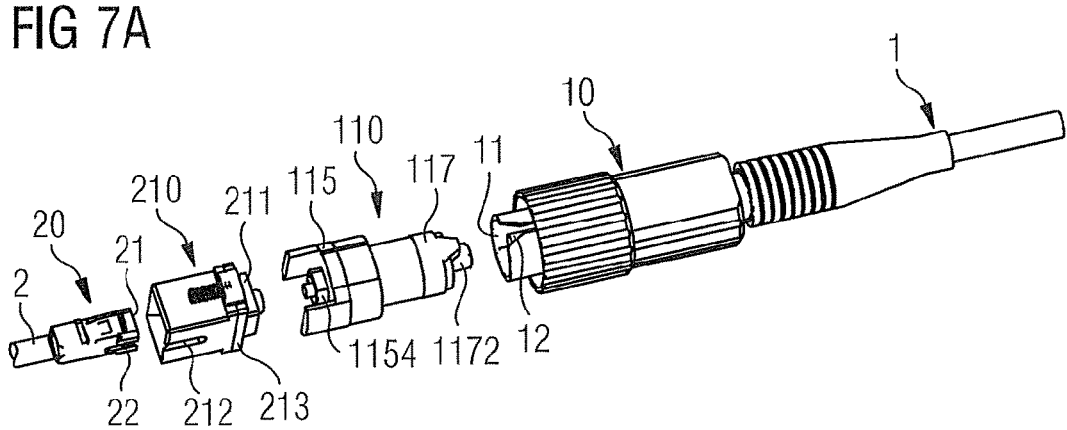
FIG. 7A illustrates a coupling element, an assembly of an optical interface and two optical connectors in an unmated condition.

FIG. 7A shows the optical connector 10 which terminates the optical cable 1 and the optical connector 20 terminating the optical cable 2. The optical connector 10 may be coupled to the assembly of the optical interface 110, particularly, to the sleeve holder 117 of the assembly of the optical interface. The sleeve holder 117 comprises an alignment element 1172 which is configured to engage in an alignment element 12 of the optical connector 10 to direct the coupling of the optical connector 10 to the sleeve holder 117. The alignment element 1172 may be configured as a nose protruding from the base part 1173 of the sleeve holder 117 as also shown in detail in FIG. 6.

The alignment element 12 of the optical connector 10 may be formed as a complementarily shaped area which is configured to be inserted in the protruding nose 1172 of the sleeve holder. The alignment element 12 may be formed as a cavity in a shroud 13 of the optical connector 10 which surrounds a ferrule 11 of the optical connector 10 to which an optical fiber of the optical cable 1 is coupled. The engaging of the alignment elements 1172 and 12 guarantee that the optical connector 10 is coupled to the assembly of the optical interface 110 in a predefined direction.

The optical connector 20 may be coupled to the assembly of the optical interface 115 by a coupling element 210 which is arranged in the fixture 220 of the receptacle 200. The coupling element 210 comprises a passageway 211 to insert a ferrule 21 of the optical connector 20 to which an optical fiber of the optical cable 20 is coupled. The coupling element 210 comprises an alignment element 212 which may be configured as a notch inside of the body of the coupling element 210 to insert a complementarily shaped alignment element 22 of the optical connector 20. The alignment element 22 may be formed as a protruding nose which engages in the notch 212 when the optical connector 20 is mechanically coupled to the coupling element 210. The alignment elements 212 and 22 ensure that the optical connector 20 is coupled to the coupling element 210 in a predefined direction.

The assembly of the optical interface 110 is mechanically coupled to the coupling element 210. The connector interface 115 comprises an alignment element 1154 which fits to an alignment element 213 of the coupling element 210. The alignment elements 1154 and 213 allow to mechanically couple the coupling element 210 to the assembly of the optical interface 110 in a predefined direction. The design of the front face of the connector shown is typical for an SC type connector. Other front face designs are available for ST or LC type connectors, resp.

Figure 7B:
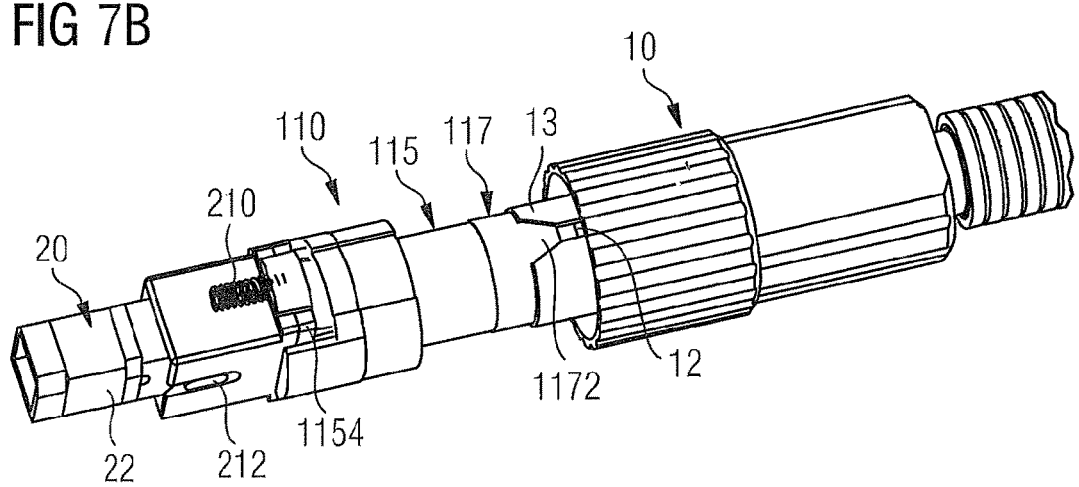
FIG. 7B illustrates a coupling element, an assembly of an optical interface and two optical connectors in a mated condition.

FIG. 7B shows the optical connector 10, the assembly of the optical interface 110, the coupling element 210 and the optical connector 20 in a mated condition. The optical connector 10 is mechanically coupled to the sleeve holder 117 by sliding the shroud 13 of the optical connector 10 to the outer surface of the sleeve holder 117 such that the alignment element 1172 of the sleeve holder fits to the alignment element 12 of the optical connector 10. The ferrule 11 of the optical connector 10 intrudes into the sleeve 116 arranged in the bore hole 1170 of the sleeve holder 117 in the mated state of the optical connector 10 and the assembly of the optical interface 110. Thus, the ferrule 11 of the optical connector 10 is optically coupled to the ferrule 111 of the optical path 114 in the interior of the assembly of the optical interface 110.

As shown in FIG. 7B, the alignment element 22 of the optical connector 20 and the alignment element 212 of the coupling element 210 ensure the mechanical coupling between the optical connector 20 and the coupling element 210 in the proper direction. The coupling element 210 is coupled to the assembly of the optical interface 110 in the predefined direction by the engagement of the alignment element 1154 of the connector interface 115 and the alignment element 213 of the coupling element 210.

Figure 7C:
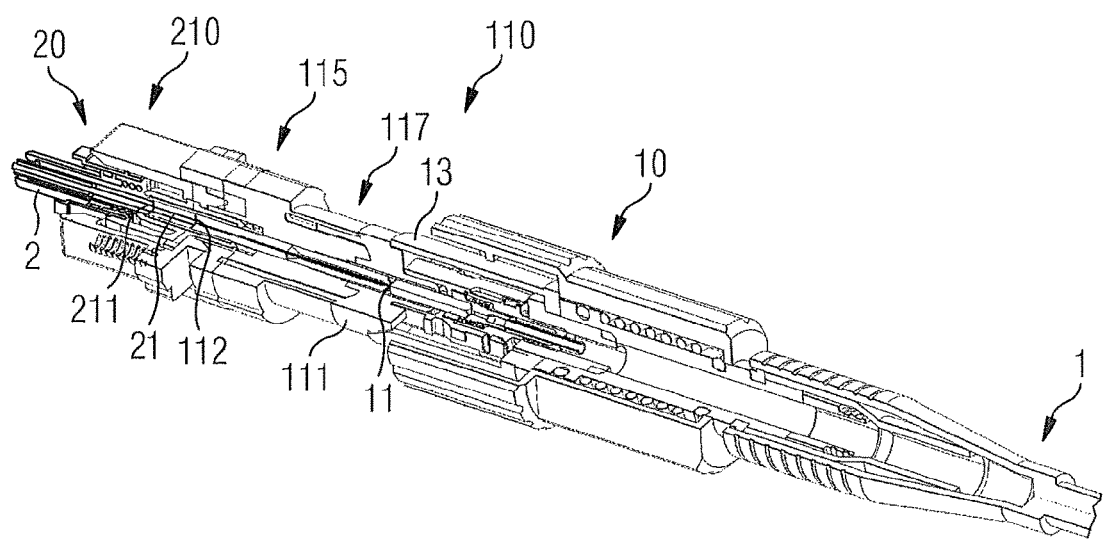
FIG. 7C illustrates a perspective sectional view of a coupling element, an assembly of an optical interface and two optical connectors in a mated condition.

FIG. 7C shows a perspective sectional view of the optical connector 10, the assembly of the optical interface 110, the coupling element 210 and the optical connector 20 in the mated condition. Due to the alignment of the optical connector 10 to the assembly of the optical interface 110, the ferrule 11 of the optical connector 10 intrudes into the sleeve 116 and abuts against the ferrule 111 of the optical path 114 which is also disposed in the sleeve 116.

The alignment between the optical connector 20 and the coupling element 210 allows that the ferrule 21 of the optical connector 20 intrudes from one side into the passageway 211 of the coupling element 210. Due to the alignment of the assembly of the optical interface 110 and the coupling element 210 the ferrule 112 intrudes from the opposite side into the passageway 211. The passageway 211 ensures that the ferrule 21 of the optical connector 20 is aligned to the ferrule 112 of the optical path. In the mated condition of the optical assembly the ferrule 11 of the optical connector 10, the ferrules 111, 112 of the optical path and the ferrule 21 of the optical connector 20 are pressed by the optical connectors 10, 20 to each other so that light can be coupled between the preconnectorized optical cables 1 and 2 with low attenuation.

Figure 8B:
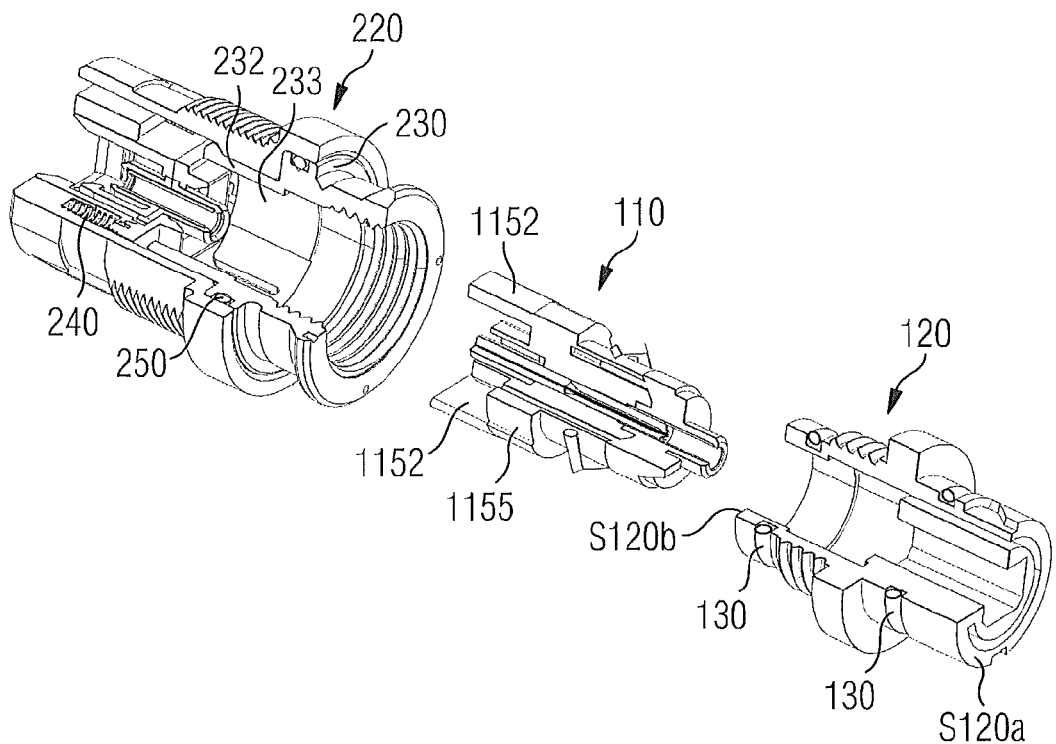
FIG. 8B shows a perspective sectional view of an assembly of an optical interface, a mounting element of an optical adaptor and a receptacle in an unmated condition.

FIG. 8A shows the optical assembly 1000 comprising the optical adaptor 100 with the assembly of the optical interface 110 and the mounting element 120 as well as the receptacle 200 in an unmated condition. FIG. 8B shows the same elements of the optical assembly 1000 in cutout view.

The mounting element 120 is formed as a hollow body having a side S120a with an opening to receive the optical connector 10 in the hollow body. The mounting element 120 comprises an alignment element 121 extending from the opening at the side S120a of the mounting element 120 into the hollow body of the mounting element 120. The alignment element 121 is configured to engage in the alignment element 12 of the optical connector 10 to direct the insertion of the optical connector 10 to the mounting element 120.

The mounting element 120 comprises a securing means 124 to mount the optical connector 10 to the mounting element 120. The securing means 124 may be configured as a bayonet locking to fix the optical connector 10 to the mounting element 120.

The mounting element 120 has a side S120b with an opening to receive the assembly of the optical interface 110. The connector interface 115 comprises a shoulder 1153. The connector interface 115 is configured so that the assembly of the optical interface 110 is insertable in the opening of the hollow body of the mounting element 120 at the side S120b of the mounting element until the shoulder 1153 impacts to the mounting element 120 at the side S120b. In this context, reference is made to FIG. 4B which shows the assembly of the optical interface 110 being inserted in the hollow body of the mounting element 120, wherein the shoulder 1153 of the connector interface abuts against the mounting element 120.

According to an embodiment of the mounting element 120 a section S1 of an outer surface F120 of the mounting element 120 is formed as a shoulder 122 located between the side S120a and the side S120b of the mounting element. Another section S2 of the outer surface F120 of the mounting element 120 is formed as a thread 123 located between the side S120b of the mounting element and the shoulder 122 of the mounting element. The thread 123 is configured to screw the mounting element 120 into the receptacle 200 such that the mounting element 120 intrudes into the fixation adaptor 230 of the receptacle with the side S120b and the side S120a of the mounting element 120 protrudes from the receptacle 200 after the mounting element 120 is mounted to the receptacle 200.

In order to assemble the optical assembly 1000, the assembly of the optical interface 110 is at first inserted in a predefined orientation into the receptacle 200. In a subsequent mounting step, the mounting element 120 is screwed to the fixation adaptor 230 of the receptacle. The external thread 123 of the mounting element is configured to be screwed to an internal thread 231 of the fixation adaptor 230.

In order to direct the insertion of the assembly of the optical interface 110 to the receptacle 200, the connector interface 115 comprises at least one alignment element 1152. The at least one alignment element 1152 may be formed as at least one finger protruding from a body of the connector interface 115. The fixation adaptor 230 may comprise a complementarily formed alignment element 232, which enables together with the alignment element 1152 of the connector interface 115 that the assembly of the optical interface 110 can only be inserted in a predefined direction into the hollow body of the fixation adaptor 230.

The connector interface 115 may further comprise another alignment element 1155 which may be formed as a lip or nose incorporated in the outer surface of the connector interface 115. The fixation adaptor 230 may comprises a complementarily shaped alignment element 233. When the assembly of the optical interface 110 is inserted in the hollow body of the fixation adaptor 230 in the right direction, the alignment elements 1155 and 233 engage so that a rotation of the assembly of the optical interface 110 inside of the receptacle 200 is prevented.

Figure 9:
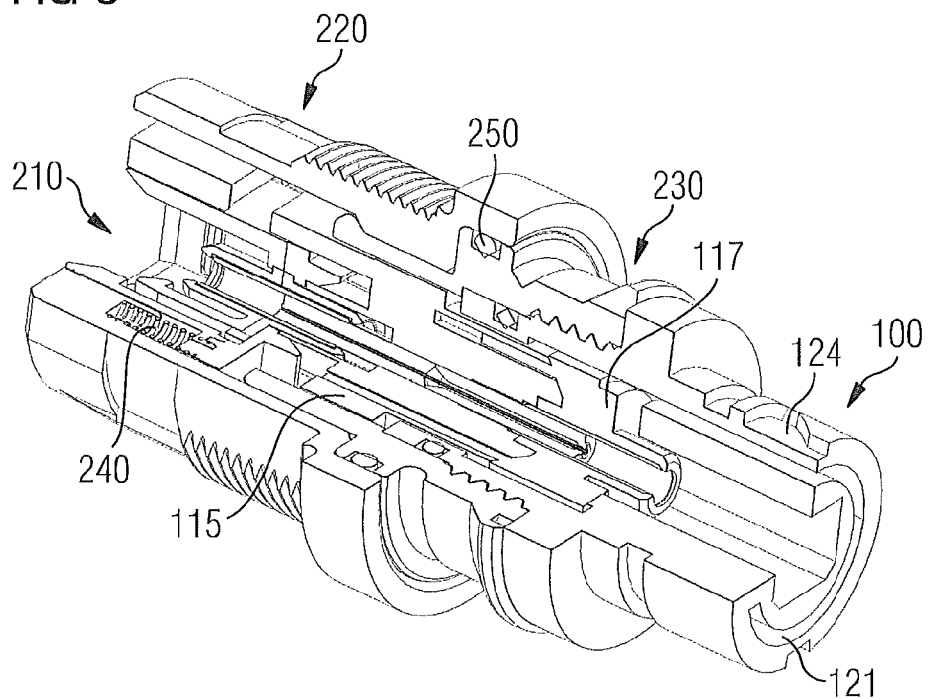
FIG. 9 shows a perspective sectional view of an optical assembly comprising an optical adaptor and a receptacle in a mated condition.

FIG. 9 shows the optical assembly 1000 to optically couple the connectorized optical cables such as preconnectorized optical cables with the optical adaptor 100 and the receptacle 200 in a mated condition. In order to assemble the different parts of the receptacle 200 the coupling element 210 is at first inserted in the fixture 220. The fixture 220 is formed as a hollow body to receive the coupling element 210. The fixation adaptor 230 is then inserted in the hollow body of the fixture 220 and fixed to the fixture 220.

Afterwards, the optical adaptor 100 is mounted to the receptacle 200 by at first inserting the assembly of the optical interface 110 in the fixation adaptor 230 and then mounting the mounting element 120 to the fixture 220 of the receptacle 200.

According to an embodiment of the optical assembly 1000, the receptacle 200 comprises at least one spring element 240 which is configured to push the coupling element 210 in the direction towards the connector interface 115 in the assembled configuration of the optical assembly as shown in FIG. 9. When optical connectors are inserted in the optical assembly from both sides, the pressure on the ferrules is defined by the spring load of the at least one spring element 240. The contact pressure is applied twice.

In order to provide a sealing between the fixation adaptor 230 and the fixture 220, the fixation adaptor 230 comprises a notch in which a sealing element 250, such as an O-ring, is arranged. A sealing between the mounting element 120 and the receptacle 200 is allowed by providing the sealing elements 140 in notches in the outer surface of the mounting element 120. The sealing elements 140 may also be configured as O-rings.

Figure 10:
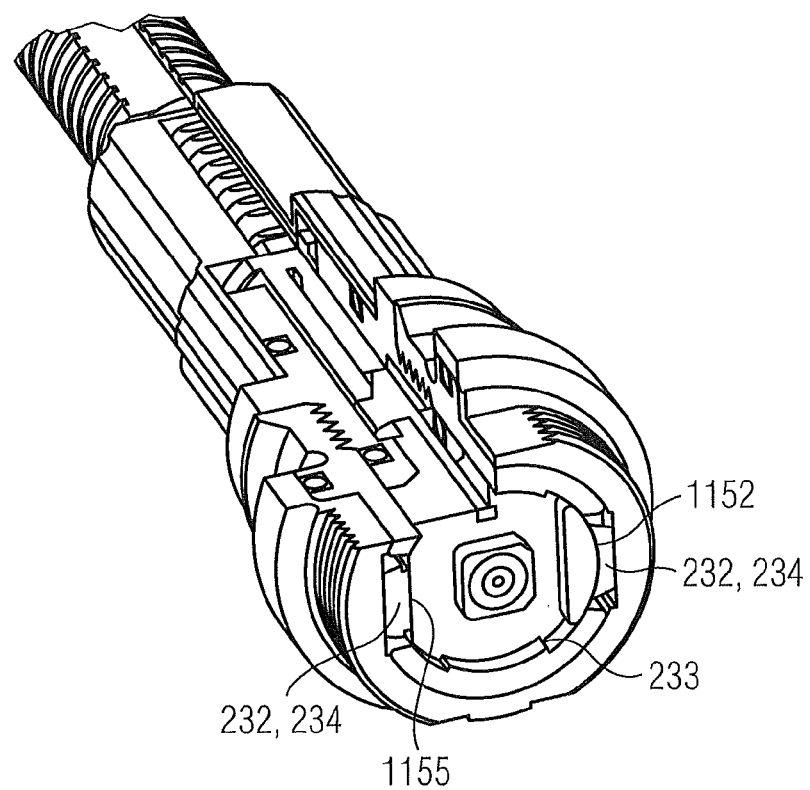
FIG. 10 is a perspective sectional view of an optical assembly with an optical connector in a mated condition.

FIG. 10 shows a perspective sectional view of the optical assembly 1000 and the optical connector 10 in a mated condition. The alignment elements 1152 of the connector interface 115 and the complementarily formed alignment elements 232 of the fixation adaptor 230 allows that the assembly of the optical interface 110 is disposed in the receptacle 200 in a predefined direction. Furthermore, the alignment elements 1155 of the connector interface and the alignment elements 233 of the fixation adaptor prevent the assembly of the optical interface 110 from rotating in the interior of the receptacle 200.

Figure 11:
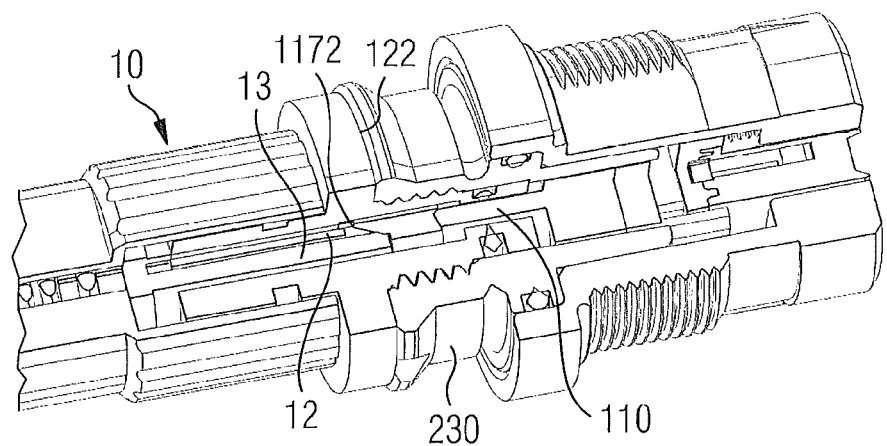
FIG. 11 is a perspective sectional view of an optical assembly with an optical connector in a mated condition.

FIG. 11 shows the optical assembly 1000 to which the optical connector 10 is coupled in a perspective sectional view. The arrow in the longitudinal direction of the optical assembly illustrates the insertion direction of the optical connector 10 into the optical assembly 1000. The assembly of the optical interface 110 is fixed against rotation inside of the receptacle 200 and simultaneously keeps the optical connector 10 in place. Since the alignment element 12, which is formed as a cavity in the shroud 13 of the optical connector 10, engages into the alignment element 1172 of the sleeve holder 117 and into the alignment element 121 of the mounting element 120, the mounting element 120 cannot rotate in the mated condition of the optical assembly and the optical connector 10. Any torsion of the mounting element 120 in the receptacle is additionally compensated by the final screw position at which the shoulder 122 of the mounting elements abuts to the fixation adaptor 230.

Figure 12:
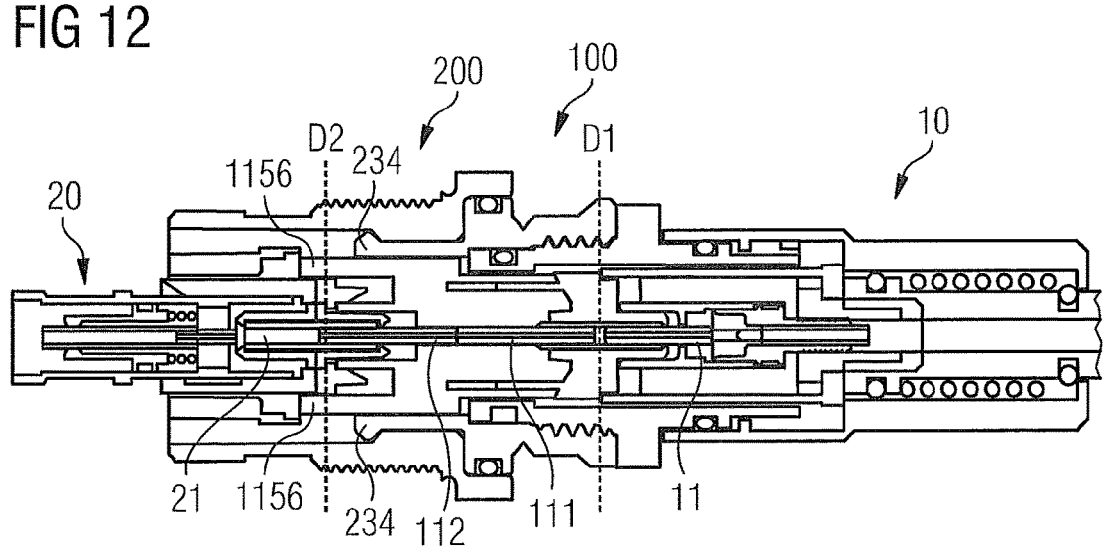
FIG. 12 shows a cross-sectional view of connectorized optical cables being coupled by an optical assembly.

FIG. 12 shows a cross-sectional view of the optical assembly 1000 comprising the optical adaptor 100 and the receptacle 200 in mated condition, wherein the optical connector 10 is coupled to the optical adaptor 100 and the optical connector 20 is coupled to the receptacle 200. The dashed line D1 illustrates the optical coupling of the ferrule 11 of the optical connector 10 to the ferrule 111 of the optical path. The other dashed line D2 illustrates the optical coupling between the ferrule 21 of the optical connector 20 and the ferrule 112 of the optical path.

As shown in FIG. 12, the fixation adaptor 230 is configured to be fixable to the fixture 220 of the receptacle. For this purpose, the fixation adaptor 230 may comprise at least one fixing element 234 which may be formed as a snap hook to fix the fixation adaptor 230 to the fixture 220. The optical interface 115 of the optical adaptor 100 may comprise an abutment element 1156 being configured to engage the at least one fixing element 234 to the fixture 220. The abutment element 1156 may be formed as a finger protruding from a base part of the connector interface 115. The abutment element 1156 is configured to exert a force to the fixing element 234 so that the snap hooks engage in an engagement area of the fixture 220 to fix the fixation adaptor 230 to the fixture 220 when inserting the assembly of the optical interface 110 in the fixation adaptor 230. According to another embodiment, the alignment element 1152 may take the function of the abutment element 1156.

What is claimed is:

1. An optical adaptor for mounting to a receptacle to optically couple connectorized optical cables, the optical adaptor comprising:
    an assembly of an optical interface comprising:
        an optical path comprising at least one ferrule and an optical fiber positioned within the at least one ferrule to optically couple a first and a second connectorized optical cable;
        a connector interface to receive the at least one ferrule, the connector interface comprising a shoulder;
        a sleeve and a sleeve holder to hold the sleeve, wherein the sleeve is configured to receive an end of the at least one ferrule of the optical path and a ferrule of a first optical connector terminating the first connectorized optical cable, and wherein the connector interface and the sleeve holder are mechanically coupled to each other;
        a first side to optically couple the first connectorized optical cable to the optical path and a second side to optically couple the second connectorized optical cable to the optical path; and
    a mounting element to mount the optical adaptor to the receptacle, wherein the mounting element is formed as a hollow body having a first side with an opening to receive the first optical connector in the hollow body and a second side with an opening to receive the assembly of the optical interface, wherein:
        the mounting element is configured to receive the assembly of the optical interface and to mechanically couple the first connectorized optical cable to the mounting element so that the first connectorized optical cable is optically coupled to the first side of the assembly of the optical interface;
        the mounting element comprises a first alignment element extending from the opening at the first side of the mounting element into the hollow body of the mounting element;
        the first alignment element of the mounting element is configured to engage in an alignment element of the first optical connector to direct the insertion of the first optical connector to the mounting element;
        the connector interface is configured so that the assembly of the optical interface is insertable in the opening of the hollow body at the second side of the mounting element until the shoulder of the connector interface impacts the mounting element at the second side of the mounting element;
        a section of an outer surface of the mounting element is formed as a shoulder located between the first side and the second side of the mounting element;
        the outer surface of the mounting element is formed as a thread located between the second side of the mounting element and the shoulder of the mounting element; and
        the thread is configured to screw the mounting element into the receptacle such that the first side of the mounting element protrudes from the receptacle.

2. The optical adaptor of claim 1, wherein the assembly of the optical interface comprises a first ferrule and a second ferrule and the optical fiber is positioned within the first ferrule and the second ferrule and comprises a first and a second section,
    wherein the first section of the optical fiber is encapsulated by the first ferrule and the second section of the optical fiber is encapsulated by the second ferrule, and
    a first end of the optical fiber terminates at an end of the first ferrule and a second end of the optical fiber opposite to the first end terminates at an end of the second ferrule, wherein the end of the first ferrule and the first end of the optical fiber are configured to optically couple light between the optical fiber and the first connectorized optical cable, and the end of the second ferrule and the second end of the optical fiber are configured to optically couple light between the optical fiber and the second connectorized optical cable.

3. The optical adaptor of claim 1, wherein the mounting element comprises a securing means to mount the first optical connector to the mounting element.

4. The optical adaptor of claim 1, wherein each of the connector interface and the sleeve holder comprises a first alignment element, and
    wherein the first alignment element of the connector interface and the first alignment element of the sleeve holder are formed in a complementary manner to direct the coupling of the sleeve holder to the connector interface.

5. The optical adaptor of claim 4, wherein the sleeve holder comprises a second alignment element being configured to engage an alignment element of the first optical connector to direct the coupling of the first optical connector to the sleeve holder.

6. The optical adaptor of claim 4, wherein the connector interface comprises at least one second alignment element to direct the insertion of the connector interface to the receptacle, and
    wherein the at least one second alignment element is configured to prevent rotating the connector interface in the receptacle.

7. An optical assembly to optically couple connectorized optical cables, comprising:
    the optical adaptor for mounting to a receptacle to optically couple the connectorized optical cables of claim 1,
    wherein the receptacle comprises a coupling element being configured to mechanically couple an optical connector terminating the second connectorized optical cable to the receptacle and to optically couple the second connectorized optical cable to the assembly of the optical interface of the optical adaptor.

8. The optical assembly of claim 7, wherein the receptacle comprises a fixture formed as a hollow body to receive the coupling element of the receptacle, and
    wherein the receptacle comprises at least one spring element being configured to push the coupling element of the receptacle to the connector interface of the optical adaptor.

9. The assembly of claim 8, wherein the receptacle comprises a fixation adaptor being configured to be fixable to the fixture of the receptacle, and wherein the mounting element of the assembly of the optical interface is mountable to the fixation adaptor.

10. The optical assembly of claim 9, wherein the fixation adaptor is formed as a hollow tube comprising an inner thread,
wherein the thread on the outer surface of the mounting element of the optical adaptor and the inner thread of the fixation adaptor are configured to screw the mounting element to the fixation adaptor,
wherein the fixation adaptor comprises at least one snap hook to fix the fixation adaptor to the fixture, and
wherein the optical interface of the optical adaptor comprises an abutment element being configured to engage the at least one snap hook to the fixture to fix the fixation adaptor to the fixture when inserting the assembly of the optical interface in the fixation adaptor being inserted in the fixture.

11. The optical adaptor of claim 1, wherein the mounting element comprises a bayonet locking to fix the first optical connector to the mounting element.

12. The optical adaptor of claim 1, wherein the connector interface comprises at least one alignment element comprising at least one finger protruding from a body of the connector interface.

13. The optical adaptor of claim 1, wherein the connector interface comprises a second alignment element formed as one of a lip or a nose incorporated in an outer surface of the connector interface.

14. The assembly of claim 9, wherein the connector interface comprises at least one alignment element comprising at least one finger protruding from a body of the connector interface, and wherein the fixation adaptor is formed as a hollow body and comprises an alignment element that is complementary with the at least one alignment element of the connector interface such that the assembly of the optical interface can only be inserted in a predefined direction into the hollow body of the fixation adaptor.

15. The assembly of claim 9, wherein the connector interface comprises a second alignment element formed as one of a lip or nose incorporated in the outer surface of the connector interface, and wherein the fixation adaptor comprises an alignment element that is complementary with the second alignment element of the connector interface such that rotation of the assembly of the optical interface inside of the receptacle is restricted.

16. The optical adaptor of claim 1, wherein the sleeve holder comprises an alignment element comprising one or more stays extending from a base part of the sleeve holder.

17. The optical adaptor of claim 16, wherein the one or more stays comprise a first stay and a second stay, wherein the first stay and the second stay define different lengths.

18. The optical adaptor of claim 16, wherein the one or more stays comprise a first stay and a second stay, wherein the first stay and the second stay define different widths.

19. The optical adaptor of claim 16, wherein the connector interface comprises an alignment element defining at least one hole in a body of the connector interface, and wherein the one or more stays of the sleeve holder and the at least one hole of the connector interface are configured such that the sleeve holder fits only in one direction to the connector interface.

20. The optical adaptor of claim 1, wherein the sleeve holder comprises an alignment element defining a nose protruding from a base part of the sleeve holder, wherein the nose engages an alignment element of the first optical connector, such that the first optical connector is coupled to the assembly of the optical interface in a predefined direction.

* * * * *